(12) United States Patent
Miyakoshi et al.

(10) Patent No.: US 7,655,086 B2
(45) Date of Patent: Feb. 2, 2010

(54) COLLOIDAL METAL-CONTAINING URUSHI LACQUER AND URUSHI LACQUERED ARTICLE

(75) Inventors: Tetsuo Miyakoshi, Tokyo (JP); Kisuke Nagase, Tokyo (JP); Yukiko Nagase, legal representative, Tokyo (JP)

(73) Assignee: Meiji University Legal Person, Tokyo (JP)

( * ) Notice: Subject to any disclaimer, the term of this patent is extended or adjusted under 35 U.S.C. 154(b) by 426 days.

(21) Appl. No.: 10/587,949

(22) PCT Filed: Feb. 8, 2005

(86) PCT No.: PCT/JP2005/001809

§ 371 (c)(1),
(2), (4) Date: May 29, 2007

(87) PCT Pub. No.: WO2005/078031

PCT Pub. Date: Aug. 25, 2005

(65) Prior Publication Data

US 2008/0206573 A1    Aug. 28, 2008

(30) Foreign Application Priority Data

Feb. 17, 2004    (JP)    ............................ 2004-039143

(51) Int. Cl.
*C08L 93/00*    (2006.01)
*C09D 193/00*    (2006.01)

(52) U.S. Cl. .................. 106/241; 428/433; 428/434; 428/440; 428/464; 428/499

(58) Field of Classification Search .................. 106/241; 428/433, 434, 440, 464, 499
See application file for complete search history.

(56) References Cited

U.S. PATENT DOCUMENTS 5,336,309 A * 8/1994 Noguchi et al. .......... 106/31.33

FOREIGN PATENT DOCUMENTS

| JP | 59-6234    | 1/1984 |
| JP | 11-80647   | 3/1999 |
| JP | 11-236521  | 8/1999 |
| JP | 2002-3720  | 1/2002 |

(Continued)

OTHER PUBLICATIONS

Nagase, K., et al.; "The Relationship between the Change of Progress Time in the Urushi Liquid by the Enzymic Polymerization and the Natural Drying Property Occurring under a Low Humidity Environment;" *Journal of the Chemical Society of Japan*; No. 10, pp. 587-593, and cover page (1 sheet), (2001).

(Continued)

*Primary Examiner*—David M Brunsman
(74) *Attorney, Agent, or Firm*—Edwards Angell Palmer & Dodge LLP

(57) ABSTRACT

An object of the present invention is to impart excellent gloss to an Urushi coating, improve drying properties, improve light fastness, and provide an environmentally responsible high-class lacquered article such as a 'Byakudan' (white sandalwood) coating or a 'Tamamushi' (iridescent) coating. This object has been accomplished by an Urushi lacquer comprising a naturally occurring raw Urushi or a refined Urushi, and metal colloid particles. As the metal colloid particles, precious metal colloid particles may preferably be used.

10 Claims, 2 Drawing Sheets

FOREIGN PATENT DOCUMENTS

| | | |
|---|---|---|
| JP | 2002-177754 | 6/2002 |
| JP | 2002-327148 | 11/2002 |
| JP | 2003-55558 | 2/2003 |
| JP | 2003-306640 | 10/2003 |
| JP | 2004-256696 | 9/2004 |

OTHER PUBLICATIONS

Nagase, K., et al.; "The Relationship between the Change in Urushiol by Repetitive "KUROME" of the Urushi Liquid and Natural Drying Property Occurring in a Low Humidity Environment;" *Journal of the Chemical Society of Japan*; No. 3, pp. 377-384, and cover page (1 sheet), (2001).

Nagase, K.; "Urushi no Hon (A Book about Urushi);" *Kenseisya*; p. 210, cover page (1 sheet), Index (3 sheets) and information page (1 sheet). (1986).

Miyakoshi, T. et al.; "Urushigaku no shinpo (Progress in Urushi Chemistry)" *IPC Ltd*; cover page (1 sheet), Index (9 sheets) and information page (1 sheet). (2000).

* cited by examiner

R= -(CH₂)₇-CH=CH-CH₂-CH=CH-CH=CH-CH₃

COLLOIDAL METAL-CONTAINING URUSHI LACQUER AND URUSHI LACQUERED ARTICLE

This application is a 371 of PCT/JP05/01809, filed Feb. 8, 2005.

TECHNICAL FIELD

The present invention relates to an Urushi lacquer (Rhus Lacquer, Urushi Lacquer, Oriental Lacquer) and, more particularly, to an Urushi lacquer in which a naturally occurring raw Urushi liquid and a precious metal colloid solution such as a gold colloid solution or a silver colloid solution, etc. are mixed, or a refined Urushi lacquer obtained by subjecting the above lacquer to kneading and refining by dehydration.

BACKGROUND ART

A natural Urushi liquid (Urushi) is a water-in-oil emulsion, and is formed from urushiol (a lipid component), a gum (a polysaccharide), a nitrogen-containing substance (a glycoprotein), laccase (an enzyme), and water. There have been many reports concerning the chemistry of Urushi liquid, including the reports of Non-patent Publications 1 to 4.

The water droplet particle size of the raw Urushi emulsion is about 10 micrometers ($\mu m$), but the average water droplet particle size of a refined Urushi whose moisture content has been reduced by a 'Nayashi' mixing and kneading process and a 'Kurome' heating process is about 1 $\mu m$. This is made into a coating and allowed to stand in an Urushi room at high humidity, the laccase enzyme contained in the water droplets oxidizes the urushiol, and the formation of urushiol quinone, the formation of dibenzofuran, the formation of a quinone-olefin addition polymer, etc. proceed. Due to a decrease in antioxidant power as a result of these reactions, an automatic oxidation reaction of unsaturated side-chain bonds proceeds, and a dried and cured Urushi coating is obtained (ref. reaction schemes in FIG. 1 and FIG. 2; the automatic side chain oxidation reaction proceeds in reality in an urushiol oligomer state or an urushiol polymer state).

It is well known that an Urushi coating exhibits a high-class image with a sense of being soft and comfortable, well-used, and of richness, and will last for a few thousand years, but since the dispersion particle size of the emulsion is relatively large, the gloss of the coating is reduced. Because of this, gloss is imparted to an Urushi coating by adding a polymerized perilla oil, a rosin-modified polymerized linseed oil, etc., wet-rubbing the surface of a dried coating, or carrying out Roiro-finishing by cylinder polishing.

(Non-patent Publication 1) Kisuke Nagase, Yukio Kamiya, Toru Kimura, Kengo Hozumi, and Tetsuo Miyakoshi, Nikka (Journal of the Chemical Society of Japan), No. 10, 587 (2001)

(Non-patent Publication 2) Kisuke Nagase, Yukio Kamiya, Kengo Hozumi, and Tetsuo Miyakoshi, Nikka (Journal of the Chemical Society of Japan), No. 3, 377 (2002).

(Non-patent Publication 3) Kisuke Nagase, 'Urushi no Hon' (Urushi Book) (Kenseisha), published September, Showa 61 (1986).

(Non-patent Publication 4) Edited and written by Tetsuo Miyakoshi, Kisuke Nagase, and Takashi Yoshida, 'Urushikagaku no Shinpo' (Progress in Urushi Chemistry), (IPC Ltd.), published May, Heisei 12 (2000).

DISCLOSURE OF INVENTION

Problems to be Solved by the Invention

One object of the present invention is to impart excellent gloss to an Urushi coating, enhance the ease of drying, and improve the light fastness. It is another object thereof to provide a high grade coated article such as an environmentally responsible 'Byakudan' (white sandalwood) coating or a 'Tamamushi' (iridescent) coating.

Means for Solving the Problems

The above-mentioned objects of the present invention can be solved by the following means (Item 1)). This is described below together with preferred embodiments Items 2) to 10).

Item 1) An Urushi lacquer comprising a naturally occurring raw Urushi or a refined Urushi and metal colloid particles, Item 2) the Urushi lacquer according to Item 1), wherein it is a mixture of the refined Urushi and the metal colloid particles, and has an average water droplet particle size of 0.1 to 3 $\mu m$, Item 3) the Urushi lacquer according to either Item 1) or 2), wherein the refined Urushi lacquer is an oil-free translucent Urushi or an oil-containing translucent Urushi, Item 4) the Urushi lacquer according to any one of Items 1) to 3), wherein the metal colloid particles are precious metal colloid particles selected from the group consisting of gold colloid particles, silver colloid particles, and platinum-group colloid particles, Item 5) the Urushi lacquer according to any one of Items 1) to 4), wherein the metal colloid particles are gold colloid particles or silver colloid particles, Item 6) the Urushi lacquer according to any one of Items 1) to 5), wherein the metal colloid particles are dispersed and stabilized by a pigment dispersion stabilizer, Item 7) the Urushi lacquer according to any one of Items 1) to 6), wherein the pH of the lacquer is adjusted to 4 to 5 by the addition of an organic acid, Item 8) the Urushi lacquer according to any one of Items 1) to 6), wherein an alkoxysilane is added, Item 9) an Urushi lacquered article coated with the Urushi lacquer according to any one of Items 1) to 8), and Item 10) the Urushi lacquered article according to Item 9), wherein it is a wooden product or a glass product.

Effects of the Invention

The colloidal precious metal-containing Urushi directed to the present invention not only enables a short curing time and a glossy rich reddish or yellowish Urushi coating to be exhibited but also enables coating light fastness to be improved. The Urushi lacquer of the present invention enables a high grade Urushi coating to be carried out using a precious metal colloid color, and further functions as an environmentally responsive ecological natural paint.

BEST MODE FOR CARRYING OUT THE INVENTION

Figure 1:
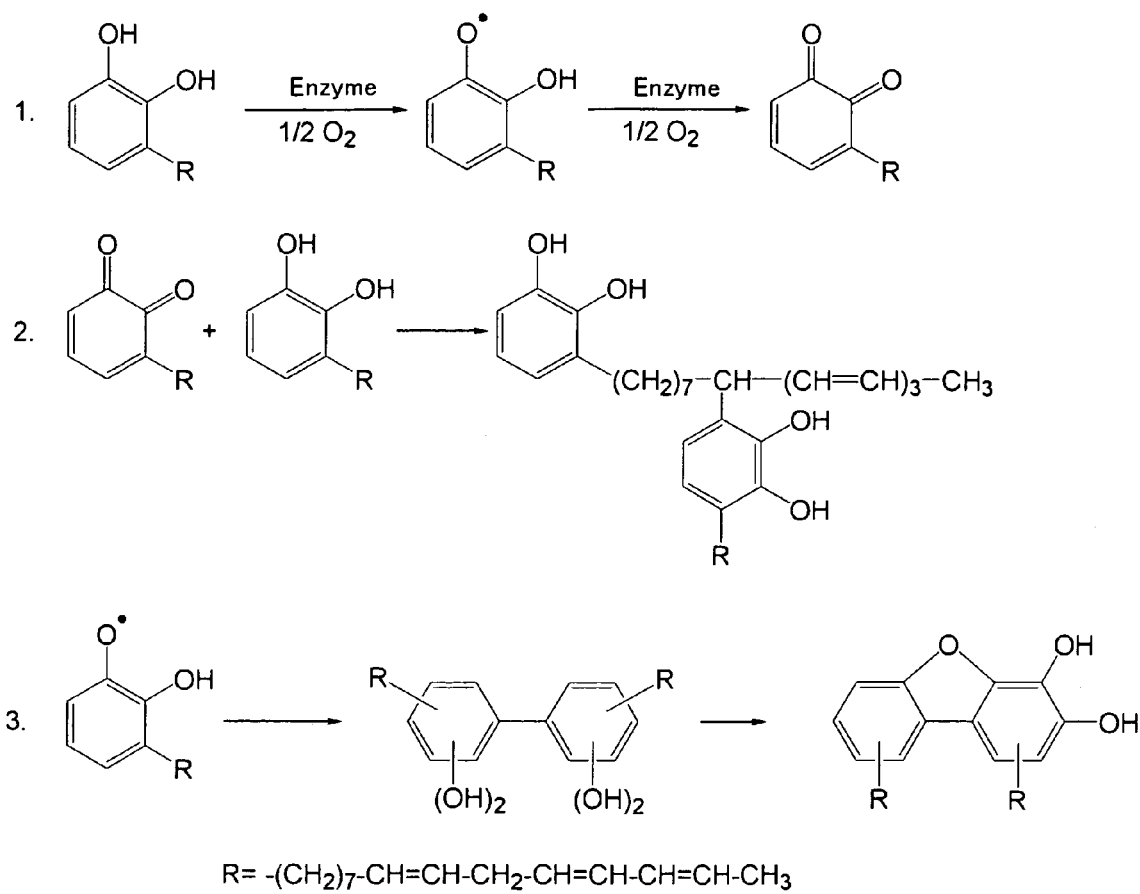
FIG. 1 shows a room temperature reaction diagram for urushiol, and shows schematically an oxidation reaction of a catechol ring by a laccase enzyme.
Figure 2:
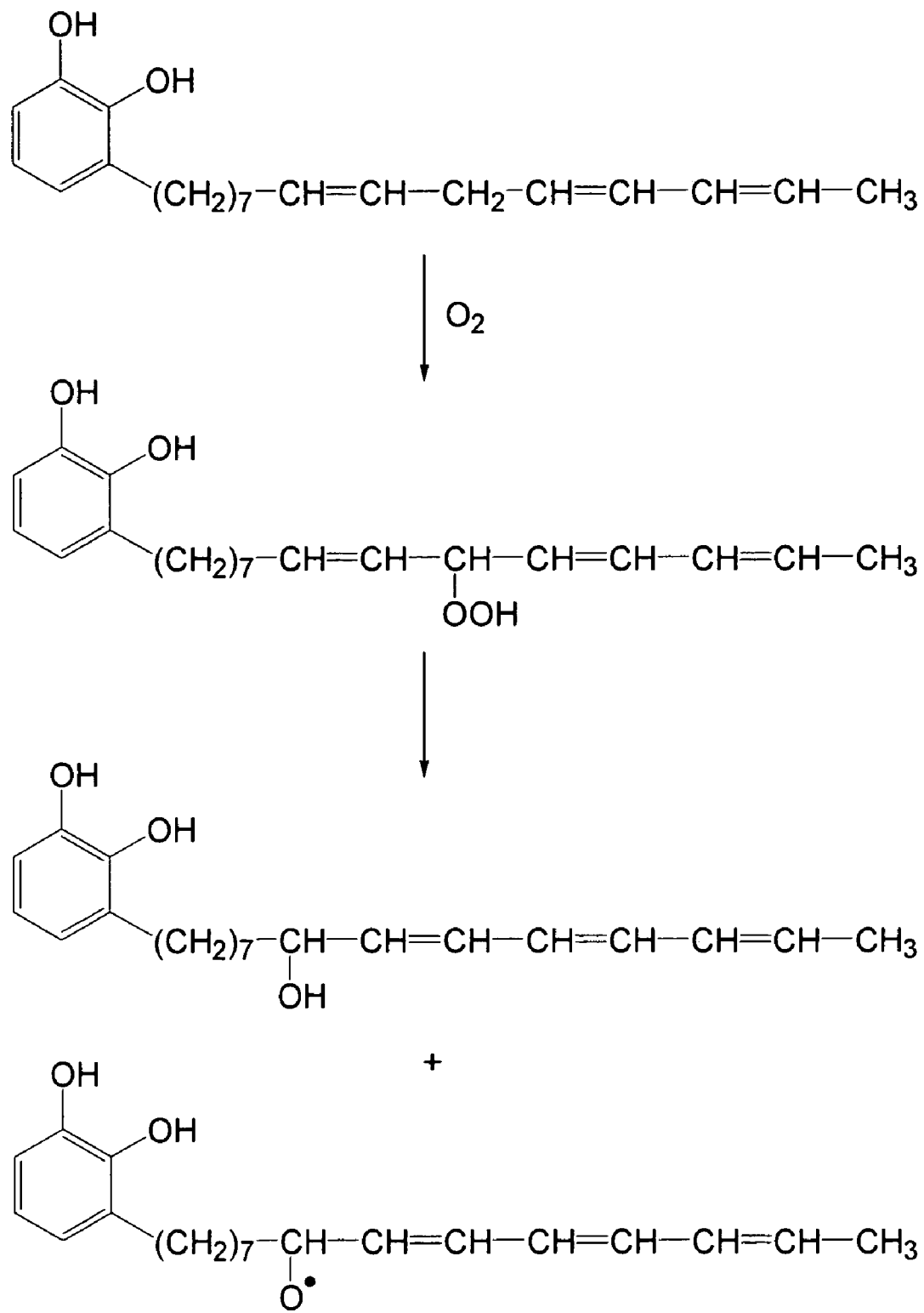
FIG. 2 shows a room temperature reaction diagram for urushiol, and shows schematically an automatic oxidation reaction of an unsaturated bond on the side chain of urushiol.

The present invention is explained in detail below.

The Urushi lacquer of the present invention is produced by microparticulating, preferably by stirring, etc., a mixture obtained by mixing a raw Urushi liquid (water-in-oil type (W/O type) emulsion) with metal colloid particles or a metal colloid solution. The 'microparticulating' referred to here means that the average water droplet particle size of the Urushi emulsion is made 3 μm or less, preferably 0.1 to 3 μm, and more preferably 0.1 to 1 μm. The average water droplet particle size here means the number average.

The Urushi lacquer of the present invention can also be obtained by mixing a microparticulated refined Urushi lacquer obtained by a Nayashi process or an additional Kurome treatment, which will be described later, with precious metal colloid particles or a precious metal colloid solution. Microparticulation has the same meaning as above.

Terms related to the raw Urushi and the refined Urushi used in the present invention accord with Japanese Industrial Standard JISK5950.

Furthermore, the 'colloid' referred to means a colloid solution or colloid particles.

Metal colloids are roughly divided into base metal colloids and precious metal colloids. Precious metals mean gold, silver, and platinum group metals, and base metals mean metals other than the precious metals. Since the precious metals are resistant to oxidation in air and maintain a metallic gloss or color as colloidal metals, they may preferably be used in the present invention. The precious metal colloids are described later.

Examples of the base metal colloid solution that can be used in the present invention include colloid solutions of magnesium, aluminum, copper, titanium, manganese, iron, cobalt, zinc, and tin. It is also possible to mix nano-order base metal colloid particles directly with a refined Urushi. These nanoparticles may be produced by a gas phase flash creation method, etc.

Since the raw Urushi as a starting material usually contains 20 to 30 wt % water and has a large emulsion size, it has poor flow-out properties as it is, and even if it were to be applied, it would only be possible to obtain a coating without gloss or smoothness. By placing the raw Urushi in a shallow wooden container and grinding and mixing it, the combined components are uniformly dispersed, and the emulsion can be microparticulated. This treatment is also called 'Nayashi'. Furthermore, imparting flow-out properties by removing excess water by heating with radiation at the same time as uniformly dispersing is also widely carried out. This treatment is also called 'Kurome'. A dehydrated refined Urushi obtained by the Kurome treatment is called Kurome Urushi. Kurome is carried out while maintaining the temperature at 45° C. or below so that laccase enzyme in the Urushi liquid is not deactivated. The degree of dehydration is also adjusted so that about 3% of the water content is left in order to prevent the laccase enzyme from being deactivated.

The dehydrated and refined Urushi is preferably used as it is as a translucent Suki Urushi (Suki Urushi). It is also possible to use it as a black Kuro Urushi by coloring the dehydrated and refined Urushi black with iron powder or iron hydroxide and then removing the solid content.

The translucent Suki Urushi or the black Kuro Urushi may be used as it is as an oil-free Urushi (also called 'Sugurome Urushi') and may also be used as an oil-containing Urushi by adding a drying oil such as linseed oil or perilla oil (including polymerized perilla oil and rosin-modified polymerized linseed oil). Oil-free translucent Urushi lacquers include Nashiji Urushi, Kijirou Urushi (Kijirou Urushi), Hakushita Urushi, Nakamuri Urushi, Tsuyakeshi Urushi, and Itsukake Urushi (Itsukake Urushi), and Hakushita Urushi is preferably used. Examples of oil-containing translucent Urushi lacquers include Shunkei Urushi, Shuai Urushi (Shuai Urushi), Nakahana Urushi, Namihana Urushi, Nuritate Urushi (Nuritate Urushi), and Tome Urushi, and Shuai Urushi may preferably be used.

In the present invention, instead of using a raw Urushi, it is preferable to use a refined Urushi, that is, a Nayashi Urushi or Kurome Urushi, which has been subjected to the above-mentioned 'Nayashi' or 'Kurome' treatment. It is also possible to produce a colloidal precious metal-containing Urushi lacquer by mixing Kurome Urushi or Shuai Urushi and a precious metal colloid solution or precious metal colloid particles and simply microparticulating.

These colloidal precious metal-containing Urushi lacquers are colored Urushi lacquers in which the precious metal colloid particles are dispersed in a stable manner, and provide a coated article having not only excellent appearance but also excellent durability.

As the starting material raw Urushi liquid, a domestic raw Urushi liquid or a foreign raw Urushi liquid may be used. Foreign products include those produced in China, Vietnam, Myanmar, etc.

The precious metal colloid solution includes precious metal colloid particles and, as necessary, a dispersion stabilizer. Examples of the precious metal include gold, silver, and the platinum group, and examples of the platinum group include ruthenium, rhodium, osmium, iridium, platinum, and palladium. Among them, gold, silver, and platinum are preferable, and gold and silver are particularly preferable. The precious metal colloid solution preferably comprises nano-order precious metal colloid particles (about 1 to 100 nm). A precious metal colloid solution comprising precious metal colloid particles having a particle size of about 5 to 20 nm is more preferable.

The precious metal colloid solution may be produced by chemically reducing a soluble precious metal salt solution, preferably in the presence of a pigment dispersion stabilizer. For example, for producing a gold colloid solution, chloroauric acid may be used as the starting material, for producing a silver colloid solution, silver nitrate or silver acetate may be used as the starting material, and for producing a platinum colloid solution, potassium chloroplatinic acid may be used as the starting material.

Examples of a reducing agent include an alkali metal hydroborate such as $NaBH_4$, a hydrazine compound, a citric acid compound such as sodium citrate, and an alkanolamine such as dimethylaminoethanol. It is generally preferable to use the reducing agent in an excess of 1.5 to 8 mol relative to 1 mol of a solution of a precious metal compound. When carrying out a reduction reaction, the metal molar concentration is preferably at least 50 mM, and more preferably at least 100 mM.

With regard to a solvent for the precious metal colloid solution, both water and an organic solvent may be used, and with regard to the organic solvent, acetone, methanol, ethanol, ethyl acetate, etc. may be used alone or in combination.

A hydrosol is preferred to an organosol since a precious metal colloid having a high concentration (at least 50 mM) is easily obtained.

In order to store the precious metal colloid solution in a stable manner, there is a method in which an ionic component is removed by, for example, electrodialysis. The electrodialysis may employ a Microanalyzer S3 manufactured by Asahi Kasei Corporation, etc. The electrodialysis can improve the stability of the precious metal colloid solution.

As the pigment dispersion stabilizer, it is generally preferable to use a polar macromolecule that is used for the purpose of stabilizing dispersion of a pigment. In the present invention, this dispersion stabilizer is preferably a macromolecular compound. The 'macromolecule' referred to here means a compound having a molecular weight of at least 10,000, and preferably at least 10,000 and at most a few hundred thousand. With regard to a polar group of the polar macromolecule, it is a group having an affinity for a colloid-form precious metal; examples thereof include an acidic group (a carboxyl group, a sulfonic acid group, a phosphoric acid group, etc.), a basic group (a tertiary amino group, a quaternary ammonium group, a heterocyclic group having a basic nitrogen atom, etc.), and a neutral group (a polyalkyleneoxy group, an epoxy group, etc.), and it is preferable to use a polar macromolecule having two or more types of polar groups as a dispersion stabilizer for the precious metal colloid. When the precious metal colloid solution is an aqueous solution (hydrosol), a water-soluble polar macromolecule having the above-mentioned polar group may preferably be used, and when the precious metal colloid solution is an organic solvent solution (organosol), a polar macromolecule that is soluble in the organic solvent may be used.

Pigment dispersion stabilizers are known and described in JP-A-4-210220, JP-A-5-177123, JP-A-6-100642, JP-A-46-7294, etc. (JP-A denotes a Japanese unexamined patent application publication). Such pigment dispersion stabilizers are commercially available, and examples thereof include the Solsperse series from Zeneca, the EFKA series from EFKA Chemical, the Disperse BYK series from BYK-Chemie, the Ajisper series from Ajinomoto Co., Inc., and the Flowlen series from Kyoeisha Chemical Co., Ltd.

The dispersion-stabilizing macromolecule is preferably used at 1 to 20 g per 10 mM of the precious metal colloid, and is more preferably used at 1 to 5 g.

The gold colloid exhibits a different color according to the particle size of the colloidal gold; examples of the color include blue, bluish purple, and reddish purple, and in the present invention a reddish purple-colored gold colloid liquid may preferably be used.

The particle size of the precious metal colloid is on the order of a few nm to a few hundred nm, but in order for the above-mentioned color to be exhibited in an excellent condition it is more preferably a few nm to a few tens of nm.

A production example of a gold colloid aqueous liquid is as follows; it is a method similar to that of Example 1 of JP-A-11-80647.

A beaker is charged with 100 mL of a 50 mM aqueous solution of chloroauric acid, and 4 g of 'Solsperse 27000' (product name) manufactured by Zeneca is dissolved as a polar macromolecule for stabilizing dispersion. Reduction is carried out by adding 2.5 mL of dimethylaminoethanol while stirring, thus giving a red gold colloid aqueous liquid.

A production example of a silver colloid aqueous liquid is as follows; it is a method similar to that of Example 3 of the above-mentioned publication.

A beaker is charged with 100 mL of a 100 mM aqueous solution of silver nitrate made acidic with nitric acid, and 5 g of 'Disper BYK 180' (product name) manufactured by BYK-Chemie is dissolved as a polar macromolecule. Reduction is carried out by adding 2.5 mL of dimethylaminoethanol while stirring, thus giving a yellow silver colloid aqueous solution.

The precious metal colloid liquid may be concentrated by ultrafiltration. A specific method is described in JP-A-2003-103158.

The solids content of a precious metal colloid liquid that can be mixed with 100 g of an Urushi component, excluding water or oil, in a raw Urushi or a refined Urushi (an oil-free translucent Urushi such as Hakushita Urushi or an oil-containing translucent Urushi such as Shuai Urushi) may be selected appropriately while taking into consideration a target color, etc., and it is generally 0.01 to 20 g, preferably 0.05 to 10 g, and more preferably 0.05 to 1.0 g. A mixture of two or more types of precious metal colloids may be used, and in this case the total amount of the precious metal colloids is preferably in the above-mentioned range.

The Urushi lacquer of the present invention is obtained by subjecting a mixture of a natural raw Urushi and a precious metal colloid to, preferably, microparticulation. The microparticulation treatment can be achieved by stirring this mixture, and preferably by stirring under shear. Specific examples of the stirring method include a homogenization dispersion method (ref. JP-A-3-174482) and a three roll mill dispersion method (ref. JP-A-4-359077), but it is not limited thereto.

Since an Urushi lacquer is nonuniform, by microparticulating emulsion particles in this way, a coating exhibiting excellent gloss can be obtained. The microparticulation size is as described above.

By subjecting the starting material raw Urushi of the present invention to the above-mentioned 'Nayashi' and 'Kurome' treatments as desired, a dehydrated refined Urushi in which the emulsion particles are dispersed as microparticles is obtained. By mixing this dehydrated refined Urushi with nano-order precious metal particles, a colloidal precious metal-containing Urushi lacquer can be obtained. Since, when the Kurome heating treatment is carried out at 45° C. or less, the laccase enzyme activity can be maintained, the Urushi coating can be dried at room temperature while humidifying. A dehydration treatment for the raw Urushi may be carried out at a temperature of 90° C. to 100° C. for 1 hour to several hours. When drying the Urushi that has been subjected to this treatment, it is necessary to employ drying while heating.

Drying of a coating is roughly divided into drying while humidifying at normal temperature and thermal curing at high temperature. Representative conditions for drying while humidifying are a humidity of 40 to 80% RH and a temperature of 20° C. to 30° C. while utilizing the action of laccase enzyme. Drying while heating is drying without utilizing the action of laccase enzyme, and drying is carried out while heating at 100° C. to 200° C., and preferably 150° C. to 200° C.

Conditions under which the colloidal precious metal-containing Urushi lacquer of the present invention is enzymically polymerized are preferably a temperature of 15° C. to 25° C. and a humidity of 60 to 90% RH. When the set humidity is high, drying is generally accelerated, but the color of the Urushi coating darkens, and wrinkles might occur in the coating. In order to finish the Urushi lacquer to which a colloidal precious metal has been added so that it exhibits a beautiful color, it is preferable to set the humidity at a lower value than for when a general Urushi lacquer is used. Preferred drying conditions are a temperature of 15° C. to 25° C. and a humidity of 60 to 80% RH, and more preferred drying conditions are a temperature of about 20° C. and a humidity of about 70% RH. A colloidal precious metal-containing Urushi lacquer to which an organosilicon as a curing promoter has been added is preferably dried and cured at a lower humidity, and preferred drying conditions are a temperature of 15° C. to 25° C. and a humidity of 50 to 60% RH.

The thickness of the Urushi coating may be selected appropriately, but a preferred thickness of the Urushi coating is 10 to 80 μm.

With regard to the colloidal metal-containing Urushi lacquer, various known additives may be added to the Urushi lacquer. In particular, an additive for adjusting the curing speed of the Urushi lacquer is useful.

In order to reduce the curing speed of Japanese Urushi, it is preferable to add an organic acid so as to make the pH of the lacquer acidic (pH=4 to 5). Examples of the organic acid include acetic acid, propionic acid, oxalic acid, citric acid, and tartaric acid, and citric acid is preferable. The amount thereof added is an amount that is necessary and sufficient for adjusting the pH.

In contrast, the curing speed of Vietnamese Urushi tends to be slow on the alkaline side.

Furthermore, in order to increase the curing speed, an organosilicon compound, and in particular an alkoxysilane, is effective. One curing promoter having an alkoxysilane as a main component contains as a component a tetraalkoxysilane and/or a condensate thereof disclosed by the present inventors. This curing promoter is disclosed in JP-A-2003-306640. A curing promoter that can preferably be used in the present invention modifies an Urushi phenolic hydroxyl group thus promoting the curing thereof, and can be represented by Formula (1) below:

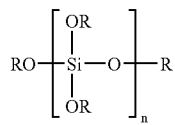

(1)

(In the formula, the R groups are alkyl groups, which may be identical to or different from each other, and n is an integer of 1 or greater.)

Specifically, R is desirably an alkyl group having 1 to 12 carbons, such as a methyl group, an ethyl group, a propyl group, or a butyl group; among these an alkyl group having 1 to 4 carbons is more preferable, and a methyl group is particularly preferable. With regard to the alkoxysilane, specifically, an orthosilicate alkyl ester (n=1), a hydrolysis condensate (n=2 to 10), or a mixture thereof is preferable, and methyl orthosilicate and a hydrolysate thereof are particularly preferable. These alkoxysilanes may be used alone or in a combination of two or more types. When used as a mixture, it becomes easy to improve the water resistance and adjust the drying speed.

The above-mentioned alkoxysilanes may be commercially available. Examples of commercial products of the methyl orthosilicate hydrolysate include silicone resin methoxy oligomer 2327 (manufactured by Shin-Etsu Chemical Co., Ltd.).

An alkoxysilane as another curing promoter that can preferably be used in the present invention modifies the phenolic hydroxyl group of an Urushi component and promotes the curing thereof, and is a compound represented by Formula (2) below and/or a condensate thereof:

$$X_n Si(OR)_m \qquad (2)$$

(In the formula, X is a group selected from the group consisting of an amino group, an alkylamino group, an aminoalkyl group, an epoxy group, an acryloxy group, a methacryloxy group, and a vinyl group, R is an alkyl group, n and m are integers of 1 to 3, which may be identical to or different from each other, and the total of n and m is 4.)

The above-mentioned alkoxysilanes are described in JP-A-2003-55558, and examples thereof include N-β-(aminoethyl)-γ-aminopropyltrimethoxysilane.

Adding an alkoxysilane enables the drying of an Urushi lacquer to be promoted, water resistance of a coating to be improved, and the durability with respect to ultraviolet irradiation to be improved as an advantage.

With regard to the mixing ratio of the above-mentioned curing promoter, preferably 1 to 30 g, and more preferably 1 to 10 g, of the alkoxysilane is mixed with 100 g of the Urushi component, excluding water and oil, in the raw Urushi or refined Urushi (Kurome Urushi such as Hakushita Urushi, Shuai Urushi, etc.) in the Urushi lacquer.

The Urushi lacquer of the present invention may be formed into a coating by applying it to various types of substrates. The substrate is not particularly limited and may be wood, metal, glass, a synthetic resin, etc., but glass and wood are preferable. With regard to the wood, either a natural wood or a laminated wood may be used.

The coating method is not particularly limited, and a conventional standard method may be employed. When the Urushi lacquer of the present invention is used for Urushi lacquering of a high grade wooden product, the effect is particularly outstanding. Examples of these wooden products include red sandalwood board, ebony board, Japanese Zelkova, karaki, and cypress. Examples of its use in coated products include traditional Japanese furnishings, crafts, and arts, and the examples of its use also include various types of Buddhist altar equipment.

An Urushi lacquered article employing sheet glass as a substrate may be used as a stained glass material. The Urushi lacquer of the present invention may also be used for the decoration of glass tableware such as wineglasses.

In particular, since an Urushi lacquer that contains a gold colloid and a hydrolysate of methyl orthosilicate forms a beautiful Burgundy coating and has excellent adhesion to glass, it may preferably be used for the coloring of glass tableware, etc.

The Urushi lacquer of the present invention is preferably used for high grade coating.

The Urushi lacquer of the present invention can give a coating that is comparable to a traditional coating method. A 'Byakudan' (white sandalwood) coating and a 'Tamamushi' (iridescent) coating referred to in traditional coating methods are techniques in which gold foil or silver foil is adhered to a undercoating using an Urushi liquid, and the top thereof is coated with an amber-colored translucent Urushi or a red-dyed Urushi, and they are known as a high-class variant coatings. In accordance with the use of the colloidal gold-containing Urushi lacquer or the colloidal silver-containing Urushi lacquer (hereinafter, also abbreviated to 'colloidal gold Urushi' or 'colloidal silver Urushi') related to the present invention, a variant coating with a metallic feel becomes possible without adhering gold foil or silver foil to a substrate.

Furthermore, in order to detect a trace amount of protein, the gold colloid is used. This utilizes the property of the gold colloid of selectively adsorbing on a protein. An Urushi lacquer is a W/O type emulsion, and has a composition system in which a gum (polysaccharide) and a nitrogen-containing substance (glycoprotein) are dispersed in urushiol. As a result of gold or silver colloid entering this emulsion it adsorbs on the polysaccharide or the glycoprotein, and the Urushi liquid itself becomes a sol and is colored with a precious metal colloid color.

The invention is specifically explained below by reference to Examples, but the present invention should not be construed as being limited thereto.

EXAMPLES

Example 1

0.5 g of a 10% concentration gold colloid aqueous liquid obtained by reducing an aqueous solution of chloroauric acid was added to 100 g of Chinese raw Urushi having a water content of 25% and kneaded using a kneader mixer for 2 hours to give an Urushi liquid having a residual water content of 5%. This was refined by filtration using a Miyoshino paper filter to give a colloidal gold Urushi having a transparent feel. This colloidal gold Urushi was applied to a glass plate using a 25 μm film applicator to give a sample for analysis, and subjected to testing. The diameter of the gold colloid particles was about 15 nm.

The above-mentioned procedure was repeated except that 5 g of a 10% concentration silver colloid aqueous liquid was used instead of 0.5 g of the 10% concentration gold colloid aqueous liquid, thus giving a colloidal silver Urushi. A sample for analysis was prepared in the same manner as above, and was subjected to testing. The diameter of the silver colloid particles was about 7 nm.

The above-mentioned sample was cured under conditions of 20° C. temperature and 70% humidity.

When a commercial raw Urushi and a refined Sugurome Urushi were compared, the results shown in Table 1 below were obtained.

It was observed from an electron microscopic photograph of the coating obtained that the Sugurome Urushi used in the present invention contained gum-containing water spheres having a particle size of 1 to 3 μm.

TABLE 1

|  | Curing drying time (hours) | Pencil hardness (After 48 hours) | Color of coating | Gloss retention after ultraviolet irradiation (60° reflection (%)) | | |
|---|---|---|---|---|---|---|
|  |  |  |  | 0 hours | 4 hours | 8 hours |
| Commercial raw Urushi (Comparison) | 14 | 3 H | Brown | 78 | 67 | 42 |
| Commercial Sugurome Urushi (Comparison) | 12 | 2 H | Brown | 78 | 70 | 67 |
| Colloidal gold Urushi (Invention) | 10 | 3 H | Red | 100 | 95 | 90 |
| Colloidal silver Urushi (Invention) | 10 | 3 H | Yellow | 100 | 94 | 93 |

Ultraviolet irradiation used in the above-mentioned testing had a wavelength of 365 nm, an illumination intensity of 2.5 mW/cm$^2$, and an irradiation distance of 100 mm. 7.5 hours of ultraviolet irradiation in this test corresponds to 1 year of ultraviolet rays for outdoor exposure.

As a glossmeter, an IG-330 Gloss Checker manufactured by Horiba Ltd. was used.

The Urushi lacquers to which the gold colloid and the silver colloid of the present invention were added had a shorter curing drying time than that of a comparison Urushi lacquer to which they were not added. Even if the Urushi coating obtained using the Urushi lacquer of the present invention was irradiated with ultraviolet rays, the surface gloss was not lost, unlike the comparative non-additive Urushi coating.

When this colloidal gold Urushi was diluted to 40% with turpentine oil and an aluminum plate was spray-coated therewith, a dried coating exhibited a reddish purple color and gave a red 'Tamamushi' (iridescent) coating with a metallic feel.

Example 2

0.5 g of a 10% concentration gold colloid solution obtained by reducing an aqueous solution of chloroauric acid was added to 100 g of Chinese Shuai Urushi having a water content of 3%, and subjected to high-speed stirring at 3,000 rpm using an As-1 High-power Mixer to give a colloidal gold Urushi having a dispersion particle size of 0.1 to 0.2 μm as a highly transparent red Urushi liquid. This was applied to a glass plate using a 25 μm film applicator to give a sample for analysis, and dried in an Urushi room (temperature 20° C., humidity 70%). The coating had a crimson Shunkei color exhibiting a high luster.

An accelerated light fastness test by ultraviolet irradiation was carried out in the same manner as in Example 1, and the result showed that the coating given by the Urushi lacquer of the present invention had excellent light fastness. The curing drying time was shorter than that of the comparison non-additive Urushi lacquer.

Example 3

5 g of a 10% concentration silver colloid solution was added to 100 g of a Shuai Urushi having a water content of 3%, and stirred well by means of a high speed stirrer to give a pale yellow colloidal silver Urushi. This colloidal silver Urushi was applied to a glass plate using a 76 μm film applicator to give a sample for analysis, and dried in an Urushi room (temperature 20° C., humidity 70%). When an accelerated light fastness test by ultraviolet irradiation was carried out in the same manner as in Example 1, the result showed that the coating given by the Urushi lacquer of the present invention had excellent light fastness. The curing drying time was shorter than that of the comparison non-additive Urushi lacquer.

Example 4

As a lacquer for a red sandalwood mortuary tablet, a colloidal gold Urushi prepared in the same manner as in Example 1 was used. A coating having surface gloss and a slightly purplish red color with a calm feel was obtained. The same effects were obtained by using an ebony board instead of the red sandalwood board.

Example 5

A coating obtained by coating a Japanese Zelkova article with the colloidal silver Urushi prepared in Example 3 gave a yellow Shunkei color exhibiting a high luster.

Example 6

5 g of a 10% concentration gold colloid liquid was added to 100 g of a refined translucent Suki-Hakushita Urushi and stirred well in a kneading stirring machine to give a pale red colloidal gold Urushi. This colloidal gold Urushi was applied to a glass plate using a 76 μm film applicator and dried in an Urushi room (temperature 20° C., humidity 70%) to give a sample for analysis. The coating had a pale red color, was glossy, and had a high luster.

Example 7

5 g of a 17% concentration silver colloid liquid was added to 100 g of a refined translucent Suki-Hakushita Urushi and stirred well in a kneading stirring machine to give a pale yellow colloidal silver Urushi. This colloidal silver Urushi was applied to a glass plate using a 76 μm film applicator and dried in an Urushi room (20° C., humidity 70%) to give a sample for analysis. The coating had a pale yellow color, was glossy, and had a high luster.

Example 8

An aqueous solution of citric acid was added to 100 g of a refined translucent Suki-Hakushita Urushi while stirring well in a kneading stirring machine so as to adjust the pH of the Urushi liquid to about 5. Subsequently, 5 g of a 10% concentration gold colloid liquid was added and further stirred well to give a pale red colloidal gold Urushi. This colloidal gold Urushi was applied to a glass plate using a 76 μm film applicator and dried in an Urushi room (20° C., humidity 70%). Although adding the aqueous solution of citric acid increased the drying time for the coating, the pale red color became vivid, and high gloss and a high luster were achieved.

By adding an aqueous solution of citric acid in Examples 1, 2, and 3, a red color for the gold colloid and a yellow color for the silver colloid became vivid, and the coatings had high gloss and a high luster.

Example 9

5 g of silicone resin methoxy oligomer 2327 (manufactured by Shin-Etsu Chemical Co., Ltd.) was added to 100 g of a Kurome Urushi while stirring well in a kneading and stirring machine, and 5 g of a 10% concentration gold colloid liquid was subsequently added and further stirred well to give a pale red colloidal gold Urushi. This colloidal gold Urushi was applied to a glass plate using a 76 μm film applicator and dried naturally. A burgundy color dried coating was obtained. Although adding the silicone resin methoxy oligomer 2327 shortened the drying time for the coating, in order to make the hue more pale and the color be exhibited slowly, drying was carried out slowly under natural drying conditions (20° C., 60% RH) with the humidity suppressed as much as possible. As a result, the coating had a clear pale red color, high gloss, and a high luster.

By adding the silicone resin methoxy oligomer 2327 (manufactured by Shin-Etsu Chemical Co., Ltd.) and a 10% concentration gold colloid liquid, and Hakushita Urushi or Shuai Urushi instead of the Kurome Urushi, a red coating was obtained for the gold colloid.

Example 10

5 g of silicone resin methoxy oligomer 2327 (manufactured by Shin-Etsu Chemical Co., Ltd.) was added to 100 g of a Kurome Urushi while stirring well in a kneading and stirring machine, and 5 g of a 17% concentration silver colloid solution was subsequently further stirred in well to give a pale yellow colloidal silver Urushi. This colloidal silver Urushi was applied to a glass plate using a 76 μm film applicator and dried naturally. Although adding the silicone resin methoxy oligomer 2327 shortened the drying time for the coating, in order to make the hue more pale and the color be exhibited slowly, drying was carried out slowly under natural drying conditions (20° C., 60% RH) with the humidity suppressed as much as possible. As a result, the coating had a clear pale yellow color, high gloss, and a high luster.

By using the silicone resin methoxy oligomer 2327 (manufactured by Shin-Etsu Chemical Co., Ltd.) and Hakushita Urushi or Shuai Urushi instead of the Kurome Urushi, and adding the 17% concentration silver colloid liquid, a yellow coating was obtained.

Example 11

A hybrid Urushi used in Example 9 was used for decoration of a wineglass. A wineglass with a Burgundy-colored pattern was obtained.

What is claimed is:

1. An Urushi lacquer comprising:
   a naturally occurring raw Urushi or a refined Urushi; and
   metal colloid particles.

2. The Urushi lacquer according to claim 1, wherein it is a mixture of the refined Urushi and precious metal colloid particles, and has an average water droplet particle size of 0.1 to 3 μm.

3. The Urushi lacquer according to claim 1, wherein the refined Urushi is an oil-free translucent Suki Urushi or an oil-containing translucent Suki Urushi.

4. The Urushi lacquer according to claim 1, wherein the metal colloid particles are precious metal colloid particles selected from the group consisting of gold colloid particles, silver colloid particles, and platinum group colloid particles.

5. The Urushi lacquer according to claim 1, wherein the metal colloid particles are gold colloid particles or silver colloid particles.

6. The Urushi lacquer according to claim 1, wherein the metal colloid particles are dispersed and stabilized by a pigment dispersion stabilizer.

7. The Urushi lacquer according to claim 1, wherein the pH of the lacquer is adjusted to 4 to 5 by the addition of an organic acid.

8. The Urushi lacquer according to claim 1, wherein an alkoxysilane is added.

9. An Urushi lacquered article coated with the Urushi lacquer according to claim 1.

10. The Urushi lacquered article according to claim 9, wherein it is a wooden product or a glass product.

* * * * *